United States Patent
Huh

(10) Patent No.: US 7,470,880 B2
(45) Date of Patent: Dec. 30, 2008

(54) APPARATUS FOR DETECTING ELECTROMAGNETIC WAVE AND PROTECTING EYES FROM GLARE

(75) Inventor: Moon Young Huh, Seoul (KR)

(73) Assignee: Utos Tech Co., Ltd. (KR)

( * ) Notice: Subject to any disclaimer, the term of this patent is extended or adjusted under 35 U.S.C. 154(b) by 0 days.

(21) Appl. No.: 11/589,542

(22) Filed: Oct. 30, 2006

(65) Prior Publication Data

US 2007/0152132 A1 Jul. 5, 2007

(30) Foreign Application Priority Data

Dec. 30, 2005 (KR) ...................... 10-2005-0134624

(51) Int. Cl.
*G01J 1/32* (2006.01)
(52) U.S. Cl. ......................... 250/205; 349/14
(58) Field of Classification Search ............. 250/201.1, 250/205, 214 B, 214 AL; 349/14; 2/8.2, 2/8.3, 8.7, 8.8; 219/147; 359/601, 604
See application file for complete search history.

(56) References Cited

U.S. PATENT DOCUMENTS

| D393,933 | S | | 4/1998 | Huh | |
| 5,880,793 | A | * | 3/1999 | Gunz et al. | 250/206 |
| 6,067,129 | A | * | 5/2000 | Fergason | 2/8.8 |
| D446,887 | S | | 8/2001 | Young | |
| 6,483,090 | B1 | * | 11/2002 | Bae | 250/214 B |
| 6,552,316 | B1 | * | 4/2003 | Bae | 250/201.1 |
| D478,111 | S | | 8/2003 | Huh | |
| 6,614,409 | B1 | * | 9/2003 | Bae | 2/8.7 |
| D481,832 | S | | 11/2003 | Huh | |
| D482,502 | S | | 11/2003 | Huh | |
| D482,503 | S | | 11/2003 | Huh | |
| 2003/0033661 | A1 | | 2/2003 | Huh | |
| 2005/0007504 | A1 | * | 1/2005 | Fergason | 250/214 B |
| 2005/0017152 | A1 | * | 1/2005 | Fergason | 250/205 |
| 2006/0080761 | A1 | | 4/2006 | Huh | |
| 2006/0185052 | A1 | | 8/2006 | Huh | |

FOREIGN PATENT DOCUMENTS

WO   WO 2005092263 A1 * 10/2005

* cited by examiner

*Primary Examiner*—Seung C. Sohn
(74) *Attorney, Agent, or Firm*—Cantor Colburn LLP

(57) ABSTRACT

An anti-glare eye protection apparatus includes an anti-glare eye protection plate, an optical detector, an electromagnetic wave sensor, an electromagnetic wave detector, a user interface, a main controller, and a light transmittance controller. The electromagnetic wave sensor senses an electromagnetic wave generated by a welding or cutting torch using at least two coils. The electromagnetic wave detector compares a signal received through the electromagnetic wave sensor with a reference value. The user interface includes a display for selecting or displaying one of the optical and electromagnetic wave detectors. The main controller applies an electromagnetic wave detector activation signal to the electromagnetic wave detector as the optical detector starts optical detection and monitors changes in a received electromagnetic wave signal based on output of the electromagnetic wave detector. The light transmittance controller controls change in light transmittance of the eye protection plate according to a signal output from the main controller.

4 Claims, 9 Drawing Sheets

— 1 —

APPARATUS FOR DETECTING ELECTROMAGNETIC WAVE AND PROTECTING EYES FROM GLARE

BACKGROUND OF THE INVENTION

1. Field of the Invention

The present invention relates to an apparatus for detecting electromagnetic waves and protecting eyes from glare, and more particularly to an apparatus for detecting electromagnetic waves and protecting eyes of a worker from glare which detects not only high-intensity light generated in welding or cutting environments but also an electromagnetic wave generated in the same to safely protect the eyes of the worker.

2. Description of the Related Art

Generally, workers use a welding light detection and anti-glare eye protection apparatus placed on their head to adjust the transmittance of light, generated by a welding or cutting torch, through an anti-glare eye protection plate of the apparatus. The apparatus typically uses an optical detector to detect light generated by the welding or cutting torch.

FIG. 1 is a perspective view of a protection mask having a conventional anti-glare eye protection apparatus.

As shown in FIG. 1, a protection mask 1 having an anti-glare eye protection apparatus 2 and solar cell 3 mounted at a front portion of the protection mask 1 reduces the intensity of light entering eyes of a worker through an anti-glare eye protection plate 5 which is a liquid crystal display (LCD) included in the anti-glare eye protection apparatus 2.

More specifically, a photosensor 4 such as a photodiode provided on the anti-glare eye protection apparatus 2 at a front portion thereof senses light generated by the welding or cutting torch. Based on the detected light, a control circuit included in the anti-glare eye protection apparatus 2 controls the anti-glare eye protection plate 5 to be darkened so that the intensity of light passing through the anti-glare eye protection plate 5 is reduced, thereby protecting eyes of the worker who wears the protection mask 1.

FIG. 2 illustrates a user interface for adjusting shade, optical detection sensitivity, and time delay of the conventional anti-glare eye protection apparatus 2.

As shown in FIG. 2, the user interface of the conventional anti-glare eye protection apparatus 2 includes a shade adjuster 6, an optical detection sensitivity adjuster 7, and a time delay adjuster 8.

The shade adjuster 6 is used to adjust a shade level of the anti-glare eye protection plate 5. The shade level indicates the level of darkness of the anti-glare eye protection plate 5. Light transmittance of the anti-glare eye protection plate 5 is controlled by adjusting the shade level using the shade adjuster 6.

The optical detection sensitivity adjuster 7 is used to adjust the sensitivity of optical detection. The optical detection sensitivity has a numerical value indicating the degree of response of the control circuit in the anti-glare eye protection apparatus to an output signal of the photosensor 4. As the optical detection sensitivity increases, the responsiveness to low illumination increases.

The time delay adjuster 8 is used to adjust time delay of the anti-glare eye protection apparatus 2. If the time delay has a low value, the control circuit of the anti-glare eye protection apparatus 2 quickly switches the anti-glare eye protection plate 5 from a dark state to a bright state upon detecting through the photosensor 4 that welding has been finished. On the other hand, if the time delay has a high value, it takes a long time to switch the anti-glare eye protection plate 5 from a dark state to a bright state.

The industry of anti-glare eye protection apparatuses generally uses a shade level in the range of 5-13, optical detection sensitivity in the range of 0-10, and time delay in the range of 0-10.

The user interface of the conventional anti-glare eye protection apparatus 2 further includes a power switch 9, a power switch used to power on or off the apparatus, a battery 10 to supply power, and a low voltage indicator 11 indicating a low voltage level of the apparatus.

However, when using only the optical detector to detect welding light, the apparatus often operates abnormally due to interference light and variations in the level of detected signals depending on the type of welding or the type of welder.

When low-current welding, outdoor welding, or thin metal welding is performed, the optical detection sensitivity is typically set to be high. If the optical detector is used alone in this case, the apparatus may operate abnormally since it responds to interference light. For example, although the anti-glare eye protection plate 5 must be brightened, it may remain in a dark state or otherwise may be slowly switched to a bright state.

A known anti-glare eye protection apparatus further includes an electromagnetic wave detector for preventing such malfunctioning.

The anti-glare eye protection apparatus including such an electromagnetic wave detector can efficiently control the transmittance of light of the anti-glare eye protection plate through electromagnetic wave detection in environments, in which it is difficult to identify welding light since ambient illumination is high and thus light other than welding light is also detected, as when outdoor welding is performed with direct exposure to sunlight, when low-current welding is performed with low-intensity welding light, or when a lighting that provides high and direct illumination to a welding target is used.

The conventional electromagnetic wave detection and anti-glare eye protection apparatus includes a rod-shaped coil (electromagnetic wave sensor) to sense high voltage-induced electromagnetic waves generated when welding is performed. However, the rod-shape coil has a narrow sensing range. That is, the rod-shape coil has low sensitivity since it has narrow vertical and horizontal sensing ranges. This results in inaccurate electromagnetic wave detection.

In addition, the rod-shaped coil has poor sensitivity in a specific direction, which causes the apparatus to operate abnormally.

SUMMARY OF THE INVENTION

Therefore, the present invention has been made in view of the above problems, and it is an object of the present invention to provide an electromagnetic wave detection and anti-glare eye protection apparatus with an electromagnetic wave sensor which includes at least two coils to increase vertical and horizontal sensing ranges, thereby accurately sensing electromagnetic waves.

In accordance with the present invention, the above and other objects can be accomplished by the provision of an apparatus for detecting an electromagnetic wave and protecting eyes from glare, the apparatus comprising an anti-glare eye protection plate for protecting eyes of a worker from light generated by a welding or cutting torch; an optical detector for detecting light generated by the welding or cutting torch; an electromagnetic wave sensor for sensing an electromagnetic wave generated by the welding or cutting torch using at least two coils; an electromagnetic wave detector for comparing a signal, which is amplified after being received through the electromagnetic wave sensor, with a preset reference value which can be varied; a user interface including a display for selecting or displaying one of the optical detector and the electromagnetic wave detector; a main controller for applying an electromagnetic wave detector activation signal to the electromagnetic wave detector as the optical detector starts optical detection and monitoring changes in a received electromagnetic wave signal based on an output of the electromagnetic wave detector and then outputting the monitored result; and a light transmittance controller for controlling a change in light transmittance of the anti-glare eye protection plate according to a signal output from the main controller.

Preferably, the electromagnetic wave detector includes first and second rod-shaped coils that extend horizontally and vertically to form a cross.

Preferably, the electromagnetic wave detector includes a resonator for resonating an electromagnetic wave signal received through the electromagnetic wave sensor; and a filter for removing noise from an output of the resonator.

Preferably, the resonator and the filter include two combinations of resonator and filter portions, the two combinations being provided respectively for the first and second coils and being arranged in parallel to each other.

Preferably, the electromagnetic wave sensor includes a first coil in the form of a rod and a second coil in the form of a ring that is formed around the first coil.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The configuration and operation of the present invention will now be described in detail with reference to the accompanying drawings.

Figure 1:
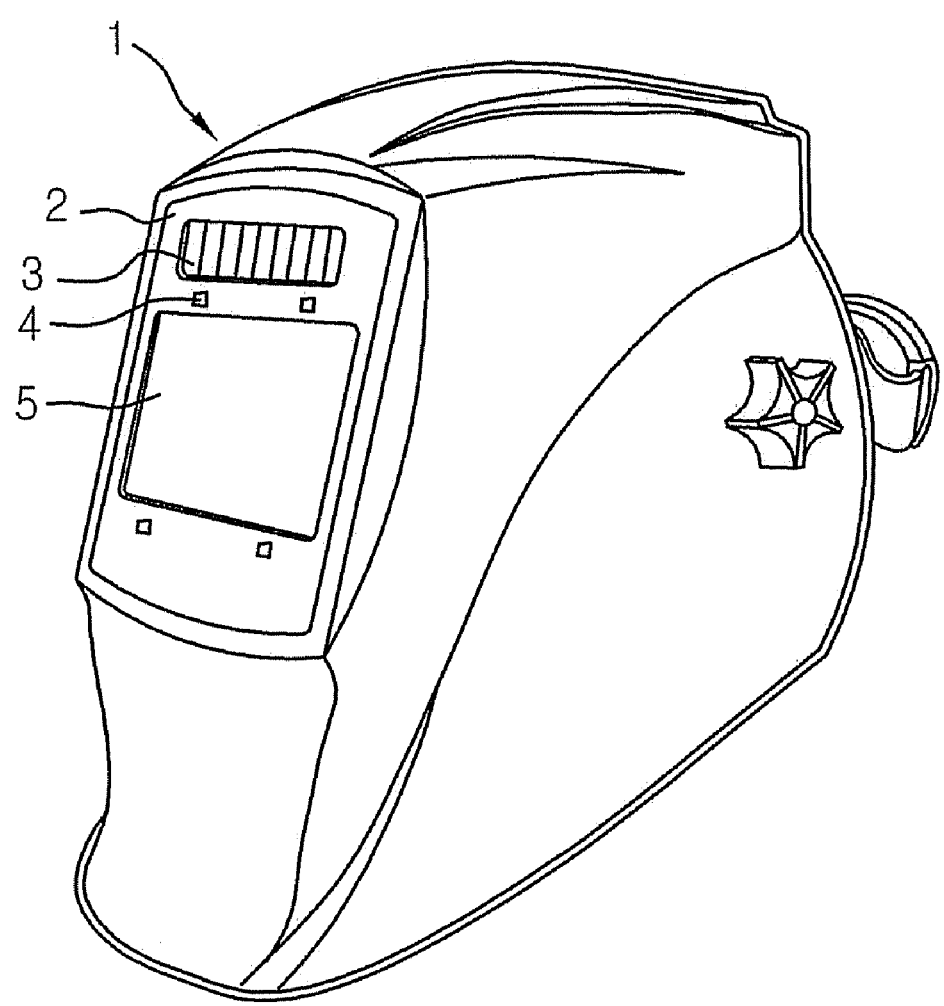
FIG. 1 is a perspective view of a protection mask having a conventional anti-glare eye protection apparatus.
Figure 2:
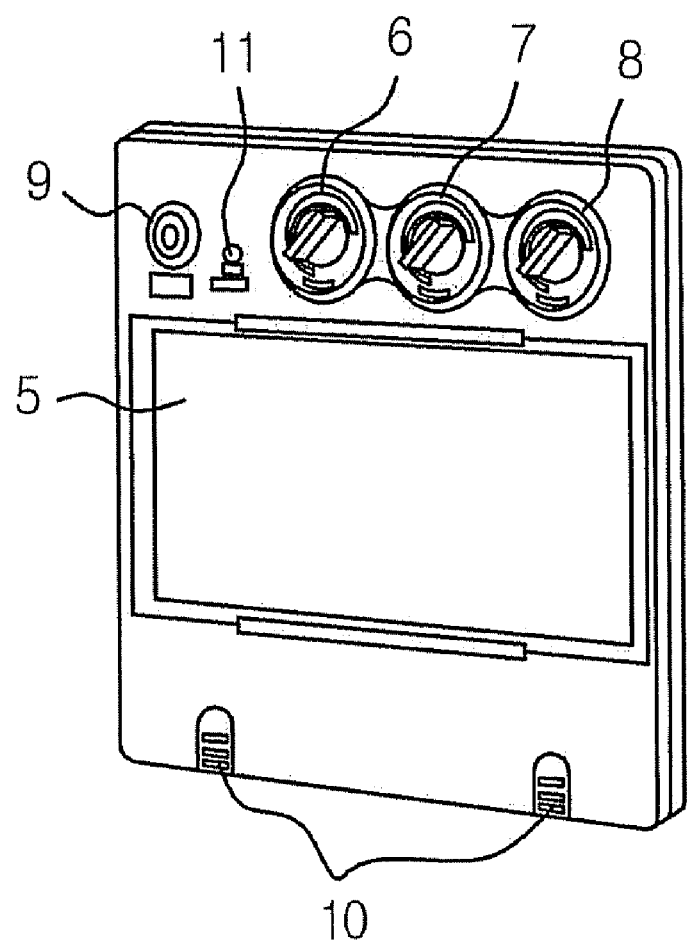
FIG. 2 illustrates a user interface of the conventional anti-glare eye protection apparatus.
Figure 3:
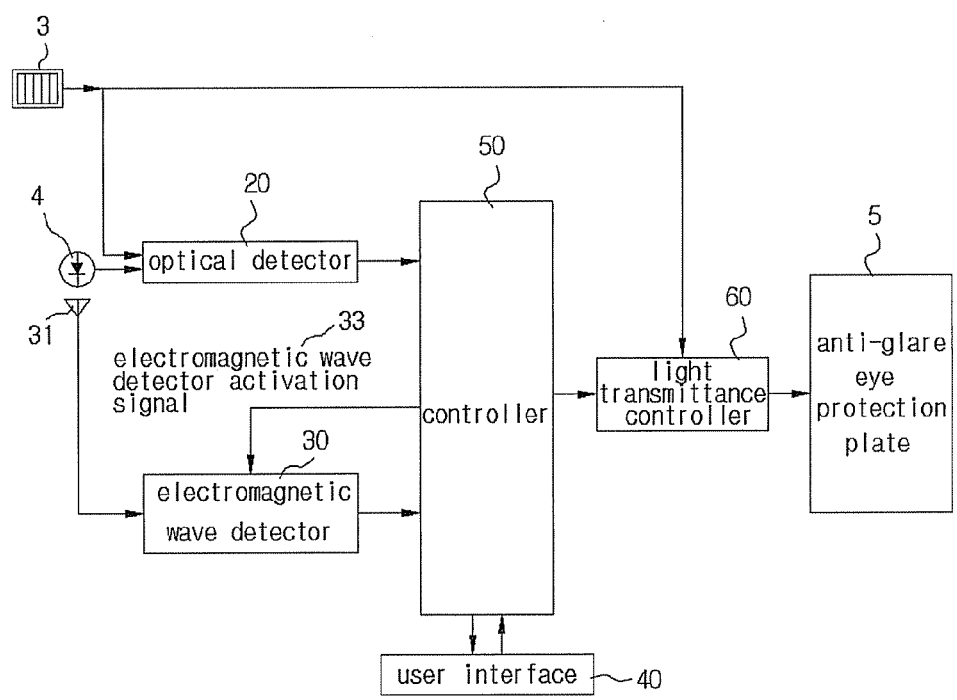
FIG. 3 is a block diagram of an apparatus for detecting electromagnetic waves and protecting eyes from glare according to the present invention.
Figure 4:
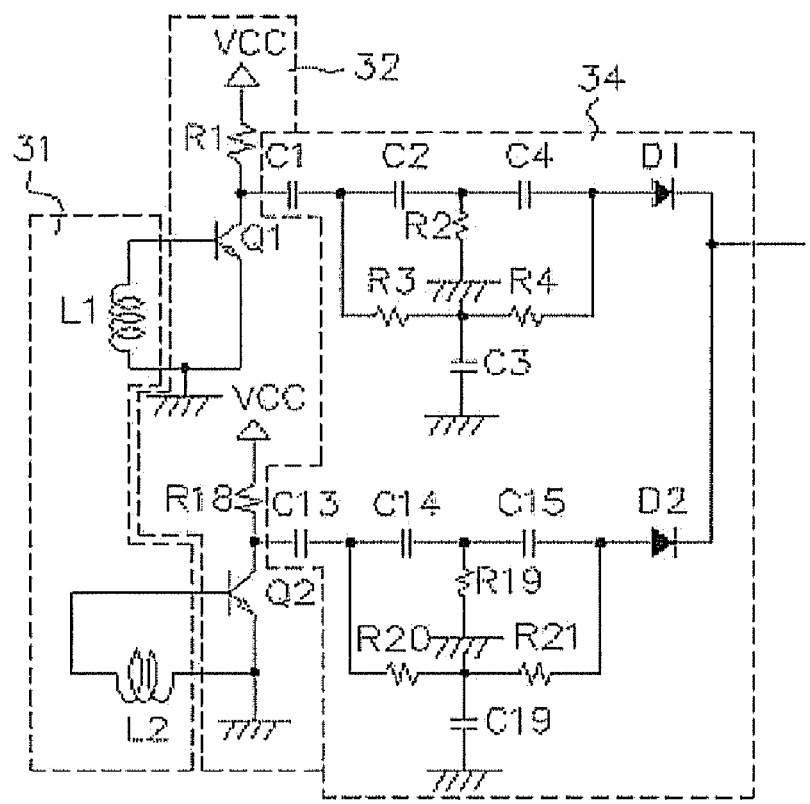
FIG. 4 is a circuit diagram of an electromagnetic wave detector according to the present invention.
Figure 5:
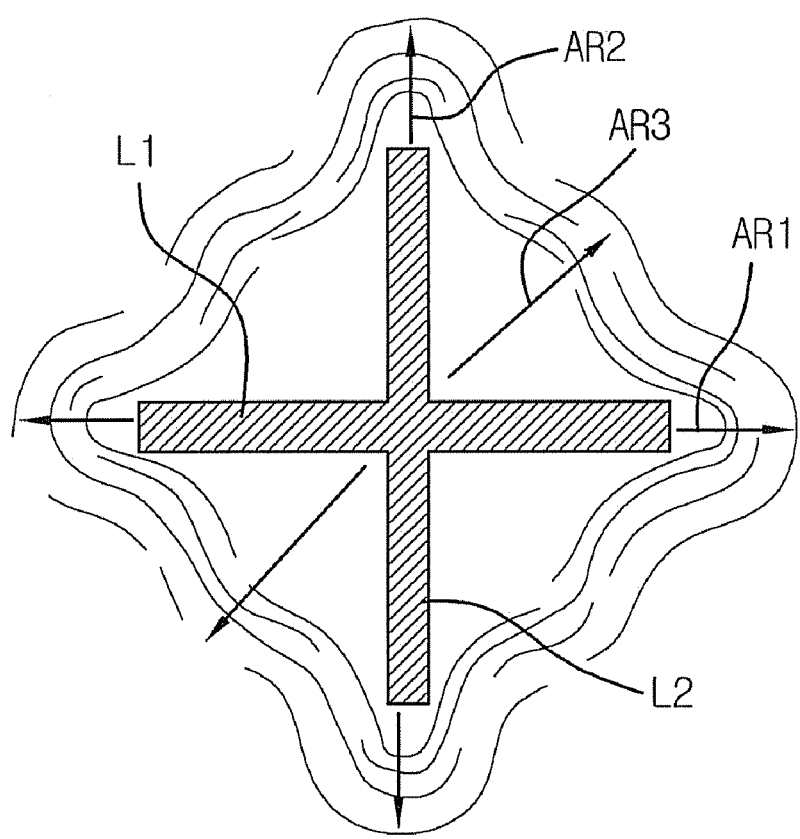
FIG. 5 illustrates an embodiment of an electromagnetic wave sensor according to the present invention.

FIG. 3 is a block diagram of an apparatus for detecting electromagnetic waves and protecting eyes from glare according to the present invention, which will hereinafter be referred to as a "welding light detection and anti-glare eye protection apparatus". FIG. 4 is a circuit diagram of an electromagnetic wave detector according to the present invention. FIG. 5 illustrates an embodiment of an electromagnetic wave sensor according to the present invention.

As shown in FIG. 3, the electromagnetic wave detection and anti-glare eye protection apparatus includes an optical detector 20, an electromagnetic wave detector 30, a user interface 40, and a light transmittance controller 60.

The optical detector 20 detects light generated by a welding or cutting torch and includes a filter and amplifier. Specifically, the optical detector 20 compares a signal input from the optical detector 4 with an output of a solar cell 3 and detects a change in the light intensity.

The electromagnetic wave detector 30 detects an electromagnetic wave generated by a welding or cutting torch. Specifically, an electromagnetic sensor 31 in the electromagnetic wave detector 30 receives an electromagnetic wave generated by a welding or cutting torch of a worker. The electromagnetic wave signal received through the electromagnetic sensor 31 is resonated and filtered and is then compared with a preset value to detect an electromagnetic wave in a specific band.

To accomplish this, the electromagnetic wave detector 30 includes a resonator 32 which resonates an electromagnetic wave signal received through the electromagnetic sensor 31 and a filter 34 which removes noise from an output of the resonator 32. The resonator 32 and the filter 34 include two combinations of resonator and filter portions which are provided respectively for the first and second coils and are arranged in parallel to each other.

The electromagnetic sensor 31 senses an electromagnetic wave generated by the welding or cutting torch using at least two coils L1 and L2.

More preferably, the electromagnetic wave detector includes first and second rod-shaped coils L1 and L2 that extend horizontally and vertically to form a cross.

The user interface 40 includes a mode selector, which is used to select one of the optical detector 20 and the electromagnetic wave detector 30, and a display that displays the selected mode.

As the optical detector 20 starts optical detection, the main controller 50 applies an electromagnetic wave detector activation signal 33 to the electromagnetic wave detector 30 and monitors changes in the received electromagnetic wave signal based on an output of the electromagnetic wave detector and outputs the monitored result.

Preferably, the main controller 50 is a microcomputer or a control circuit including the microcomputer. Once the optical detector 20 starts optical detection and inputs its output to the main controller 50, the main controller 50 applies an electromagnetic wave detector activation signal 33 to the electromagnetic wave detector 30 to start detecting an electromagnetic wave received through the electromagnetic wave sensor 31. The main controller 50 monitors changes in the received light intensity using an output of the optical detector 20 and monitors changes in the received electromagnetic wave strength using an output of the optical detector 20. If no change occurs in the received light intensity or in the received electromagnetic wave strength, the main controller 50 suspends operation until a change occurs.

The light transmittance controller 60 is activated when a voltage received from the solar cell 3 has exceeded a preset value and controls light transmittance of the anti-glare eye protection plate 5 according to an output signal of the main controller 50.

Figure 6:
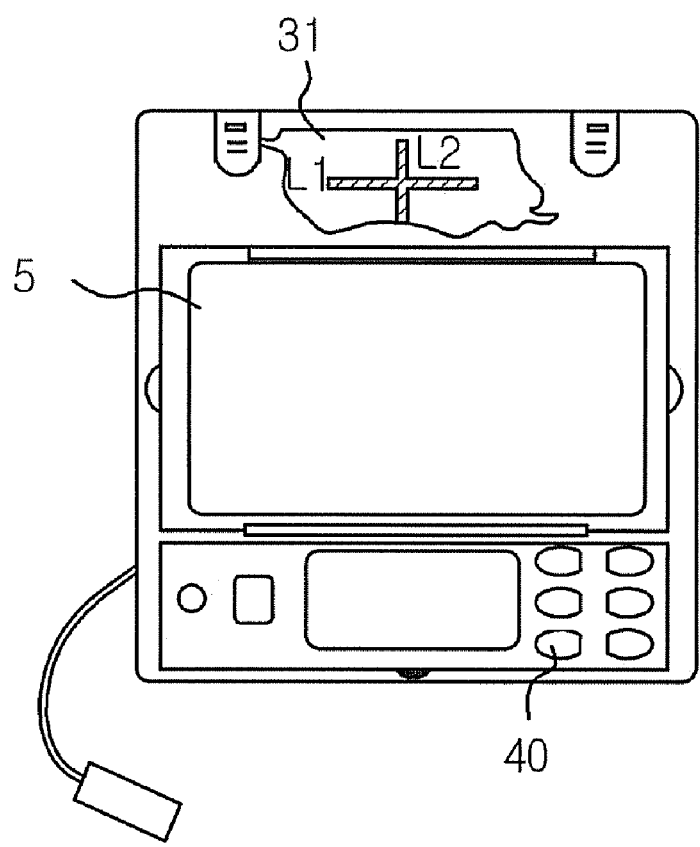
FIGS. 6 and 7 illustrate user interfaces of the electromagnetic wave detection and anti-glare eye protection apparatus according to the present invention.
Figure 7:
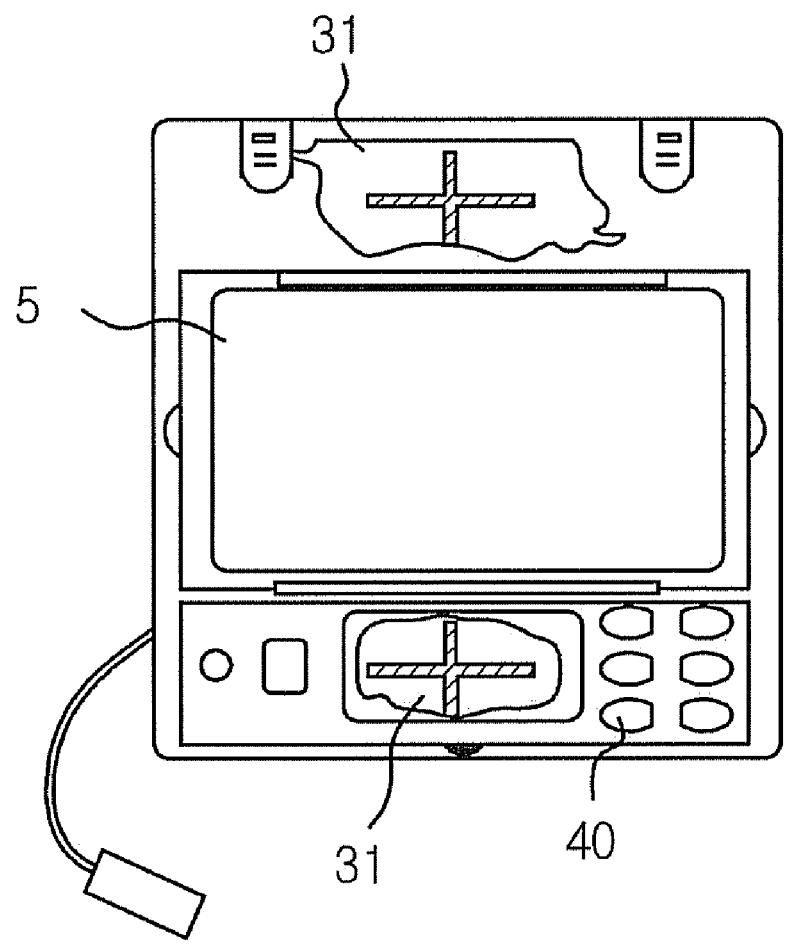

FIGS. 6 and 7 illustrate user interfaces of the electromagnetic wave detection and anti-glare eye protection apparatus according to the present invention.

The electromagnetic wave detection and anti-glare eye protection apparatus according to the present invention controls a change in the light transmittance of the anti-glare eye protection plate 5 provided on a welding surface of the apparatus at a center portion of the welding surface.

The user interface 40 is used to select and display the mode and also to control shade, optical detection sensitivity, time delay, and electromagnetic wave detection sensitivity.

The electromagnetic wave sensor 31 senses an electromagnetic wave generated by the welding or cutting torch using at least two coils L1 and L2. The first and second rod-shaped coils L1 and L2 extend vertically and horizontally to form a cross.

The electromagnetic wave sensor 31 may be formed on the welding surface at an upper position of the welding surface. Two electromagnetic wave sensors may also be formed on the welding surface at upper and lower positions of the welding surface. More than two electromagnetic wave sensors may also be formed on the welding surface at more than two positions of the welding surface.

Figure 8:
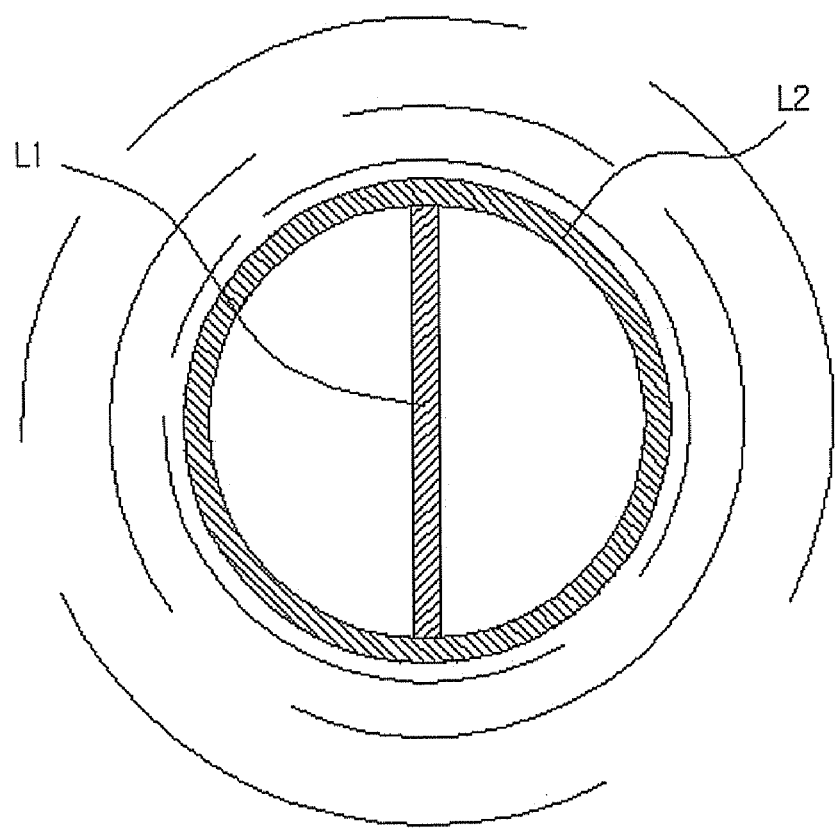
FIG. 8 illustrates another embodiment of the electromagnetic wave sensor according to the present invention.

FIG. 8 illustrates another embodiment of the electromagnetic wave sensor according to the present invention. In this embodiment, the electromagnetic wave sensor 31 includes a first coil L1 in the shape of a rod and a second coil L2 in the shape of a ring that is formed around the first coil L1.

Figure 9:
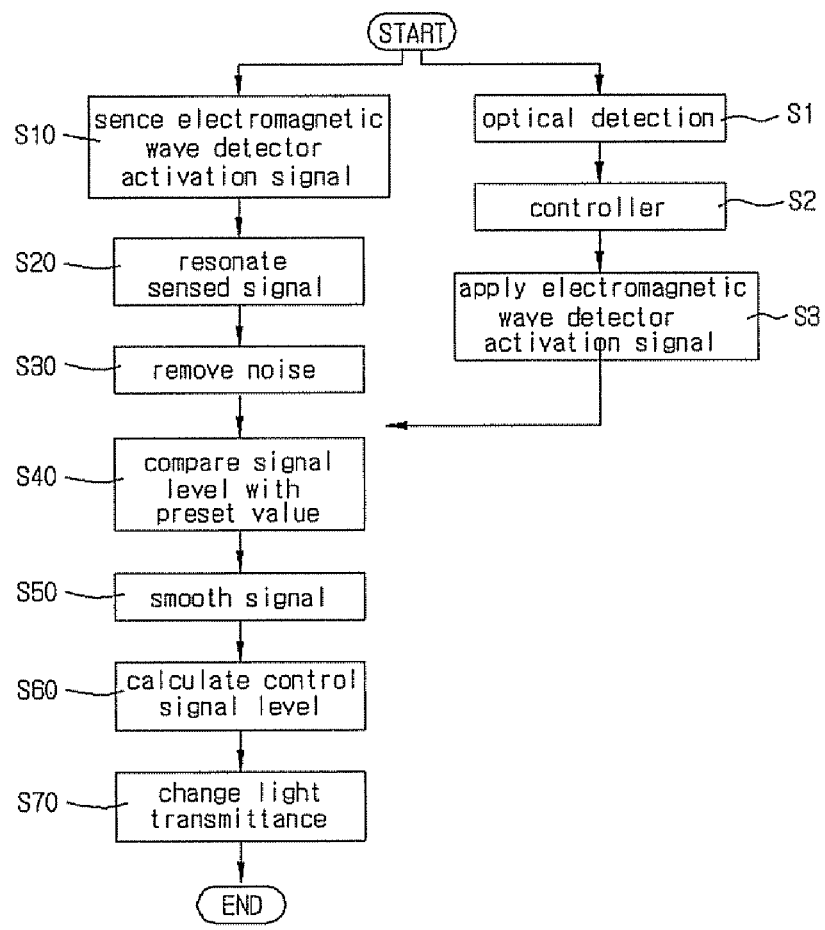
FIG. 9 is a flow chart of the operation of the anti-glare eye protection apparatus according to the present invention.

FIG. 9 is a flow chart of the operation of the anti-glare eye protection apparatus according to the present invention. The operation and function of the anti-glare eye protection apparatus according to the present invention will now be described with reference to FIG. 9.

First, the optical detector 20 detects a change in the intensity of light generated by a welding or cutting torch (S1). The detected signal is then input to the main controller 50 (S2). Upon receiving the detected signal, the main controller 50 inputs an electromagnetic wave detector activation signal 33 to the electromagnetic wave detector 30 (S3). Then, the electromagnetic wave detector 30 compares the electromagnetic wave signal received from the electromagnetic wave sensor 31 with a preset reference value (S10-S40).

The signal output from the electromagnetic wave sensor 31 is smoothed by an integration circuit that includes a resistor and a capacitor of a time constant portion (S50).

The main controller 50 receives the smoothed signal and calculates the strength of the detected electromagnetic wave through a microcomputer or a control circuit including the microcomputer (S60).

According to the calculation at step S60, the main controller 50 determines the strength of the electromagnetic wave generated by the welding or cutting torch, which passes through the anti-glare eye protection plate 5, to change the light transmittance of the anti-glare eye protection plate 5 (S70). In this manner, the main controller 50 detects not only light generated in welding environments but also an electromagnetic wave generated in the same and controls the light transmittance of the anti-glare eye protection plate 5, thereby more safely protecting the eyes of the worker.

As is apparent from the above description, the apparatus for detecting an electromagnetic wave and protecting eyes from glare according to the present invention has a variety of advantages. For example, since the electromagnetic wave sensor includes at least two coils which increases the vertical and horizontal sensing ranges, the electromagnetic wave sensor more accurately detects electromagnetic waves generated in welding environments.

In addition, the efficiency of electromagnetic wave detection can be further increased since the coils included in the electromagnetic wave sensor are formed in a variety of efficient shapes such as a cross or a ring.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting an electromagnetic wave and protecting eyes from glare, the apparatus comprising:
    an anti-glare eye protection plate for protecting eyes of a worker from light generated by a welding or cutting torch;
    an optical detector for detecting light generated by the welding or cutting torch;
    an electromagnetic wave sensor for sensing an electromagnetic wave generated by the welding or cutting torch using at least two coils each having a different shape or different orientation;
    an electromagnetic wave detector for comparing a signal, which is amplified after being received through the electromagnetic wave sensor, with a preset reference value which can be varied;
    a user interface including a display for selecting or displaying one of the optical detector and the electromagnetic wave detector;
    a main controller for applying an electromagnetic wave detector activation signal to the electromagnetic wave detector as the optical detector starts optical detection and monitoring changes in a received electromagnetic wave signal based on an output of the electromagnetic wave detector and then outputting the monitored result; and
    a light transmittance controller for controlling a change in light transmittance of the anti-glare eye protection plate according to a signal output from the main controller,
    wherein the electromagnetic wave detector includes:
        a resonator for resonating an electromagnetic wave signal received through the electromagnetic wave sensor; and
        a filter for removing noise from an output of the resonator,
        the resonator and the filter including two combinations of resonator and filter portions, the two combinations being provided respectively for the first and second coils.

2. The apparatus according to claim 1, wherein the at least two coils includes first and second rod-shaped coils that extend horizontally and vertically to form a cross.

3. The apparatus according to claim 1, wherein the two combinations being provided respectively for the first and second coils are arranged in parallel to each other.

4. The apparatus according to claim 1, wherein the at least two coils includes a first coil in the form of a rod and a second coil in the form of a ring that is formed around the first coil.

* * * * *